(12) United States Patent
Seipold et al.

(10) Patent No.: US 8,808,131 B2
(45) Date of Patent: Aug. 19, 2014

(54) MULTI-RANGE HYDRO-MECHANICAL TRANSMISSION

(75) Inventors: John M. Seipold, Glasford, IL (US); Glen P. Calvert, Washington, IL (US); Robert E. Black, East Peoria, IL (US); Michael G. Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 13/407,311

(22) Filed: Feb. 28, 2012

(65) Prior Publication Data
US 2013/0226416 A1 Aug. 29, 2013

(51) Int. Cl.
F16H 37/06 (2006.01)

(52) U.S. Cl.
USPC .......................................................... 475/219

(58) Field of Classification Search
USPC .................................. 475/207, 219
See application file for complete search history.

(56) References Cited

U.S. PATENT DOCUMENTS

| | | | |
|---|---|---|---|
| 4,382,392 A | 5/1983 | Meyerle et al. | |
| 4,976,665 A | 12/1990 | Hagin et al. | |
| 5,564,998 A * | 10/1996 | Fellows | 475/216 |
| 5,730,678 A | 3/1998 | Larkin | |
| 6,450,912 B2 | 9/2002 | Todeschini | |
| 7,220,210 B2 | 5/2007 | Soh | |
| 7,402,119 B2 | 7/2008 | Kamada et al. | |
| 7,488,269 B2 | 2/2009 | Tabata et al. | |
| 7,524,255 B2 | 4/2009 | Matthews | |
| 7,588,509 B1 | 9/2009 | Marsha | |
| 7,905,810 B2 | 3/2011 | Hukill et al. | |
| 7,912,617 B2 | 3/2011 | Wright et al. | |
| 2005/0101426 A1 | 5/2005 | Sugino et al. | |
| 2006/0276290 A1 | 12/2006 | Fabry et al. | |
| 2009/0036248 A1 | 2/2009 | Mueller et al. | |
| 2009/0062056 A1 | 3/2009 | Kato et al. | |
| 2009/0143182 A1 * | 6/2009 | Thomas et al. | 475/159 |
| 2010/0304912 A1 | 12/2010 | Sime | |
| 2010/0323843 A1 | 12/2010 | Wittkopp et al. | |
| 2011/0015022 A1 | 1/2011 | Stoeckl et al. | |

FOREIGN PATENT DOCUMENTS

JP 2009008190 1/2009

* cited by examiner

Primary Examiner — Justin Holmes
Assistant Examiner — Stacey Fluhart
(74) Attorney, Agent, or Firm — Leydig, Voit & Mayer

(57) ABSTRACT

A continuously variable transmission includes two planetary gear sets having two outputs. A variator drives a ring gear of the second planetary gear set, and a transmission input shaft is driven by the engine, which also drives the variator and the planetary input. Second and third output shafts are connected to a transmission output shaft. A first clutch is connected to the first output shaft, a second clutch is connected to the second planetary output and engages a first drive gear. A third clutch is connected to the first output shaft and releasably engages the first drive gear, a fourth clutch is connected to the first drive gear and releasably engages the second output shaft, and a fifth clutch is connected to the first drive gear and releasably engages the third output shaft.

13 Claims, 13 Drawing Sheets

MULTI-RANGE HYDRO-MECHANICAL TRANSMISSION

TECHNICAL FIELD

This patent disclosure relates generally to continuously variable transmissions and, more particularly, to hydro-mechanical transmissions for use in vehicle or machine powertrains.

BACKGROUND

Multi-range hydro-mechanical transmissions are known for providing smooth shifting between various different gear ratios in machines and other vehicles. Shifting in a typical hydro-mechanical transmission is accomplished by the use of two or more clutches that can synchronously disengage one gear ratio while simultaneously engaging another gear ratio. The synchronization of clutch speed can be achieved by use of synchronizing assemblies, which can be embodied in various forms. One known structure for a synchronizing assembly includes gears connected to clutches that are configured to selectively engage two or more rotating elements in a transmission such that a rotating element associated with the gear to be engaged is made to rotate at the same speed as a rotating element associated with the gear already engaged. In this way, the transmission of torque and power between gears can be shifted smoothly and without an abrupt step.

One example of a known hydro-mechanical transmission can be seen in U.S. Pat. No. 7,530,913 (the '913 patent), which was granted on May 12, 2009. The '913 patent describes a "Multi-Range Hydromechanical Transmission" that includes an input member, a hydrostatic transmission and a mechanical transmission. The mechanical transmission of the '913 patent includes first and second synchronizing assemblies for synchronizing first or second output members of the transmission to a combined output speed from the input member and the hydrostatic transmission. In one embodiment of the transmission described in the '913 patent, first and second clutch assemblies alternately engage to transfer power from the synchronized output member to a final drive.

Although the transmission described in the '913 patent effectively shifts between forward and reverse gears, it includes three synchronizers and two clutches when embodied in a transmission having five gear ratios, for example, three forward and two reverse gears. During operation, one synchronizer and one clutch are engaged for each gear ratio, which means that the second clutch and the remaining two synchronizers are idle. Thus, each gear change requires the engagement of one of the idle synchronizers and the disengagement of another. Such synchronizer engagement and disengagement at each gear shift can cause wear in the friction material of the synchronizers, especially for high-torque applications such as in heavy trucks and earth working machines and other heavy machines. Moreover, the relative complexity of synchronizers decreases the reliability and increases the cost of the transmission.

SUMMARY

In one aspect, the disclosure describes a machine powertrain that includes an engine connected to a continuously variable transmission. The continuously variable transmission includes a planetary gear arrangement having first and second planetary gear sets. The first planetary gear set is connected to a planetary input, a sun gear of the second planetary gear set is connected to a second output shaft, and a carrier gear of the second planetary gear set is connected to a first planetary output. A variator includes a variable-speed prime mover, which is configured to drive a ring gear of the second planetary gear set. A transmission input shaft is driven by the engine and configured to drive the variator and the planetary input. A second output shaft and/or a third output shaft of the transmission is/are connected to a transmission output shaft. A first clutch is connected to the first output shaft. A second clutch is connected to the second planetary output and configured to releasably engage a first drive gear. The first drive gear is configured to rotate in an opposite direction relative to the third output shaft. A third clutch is connected to the first output shaft and releasably engages the first drive gear. A fourth clutch is connected to the first drive gear and configured to releasably engage the second output shaft. A fifth clutch is connected to the first drive gear and configured to releasably engage the third output shaft.

In another aspect, the disclosure describes a method for operating a continuously variable transmission. The method includes determining whether a shift from a current gear selection to a new gear selection is required. Parameters of the new gear selection are analyzed and compared to parameters of the current gear selection. One of a forward-motion clutch or a reverse-motion clutch is disengaged and the other is engaged when the new gear selection is in a different direction than the current gear selection. Also, a current gear selection clutch is disengaged and a new gear selection clutch is engaged. The disengaging and engaging of the forward- and reverse-motion clutches and the disengaging and engaging of the current and new gear selection clutches occur simultaneously and within a short time period. The disengaging and the engaging operations are modulated, and a variator contribution is further modulated to ensure that a gear speed difference between the current gear selection and the new gear selection is substantially zero. A speed difference of substantially zero, as used herein, means that the speed variation is not noticeable or is barely noticeable by an operator of the machine or vehicle during a shift.

DETAILED DESCRIPTION

This disclosure relates to hydro-mechanical transmissions and, more particularly, to hydro-mechanical transmissions that include a plurality of hydraulic clutches configured to provide synchronous shifting without the use of synchronizers. Although the embodiments disclosed herein are described in the context of earthmoving machines, they are suitable for other applications such as automotive applications, light, medium and heavy duty trucks and the like.

Figure 1:
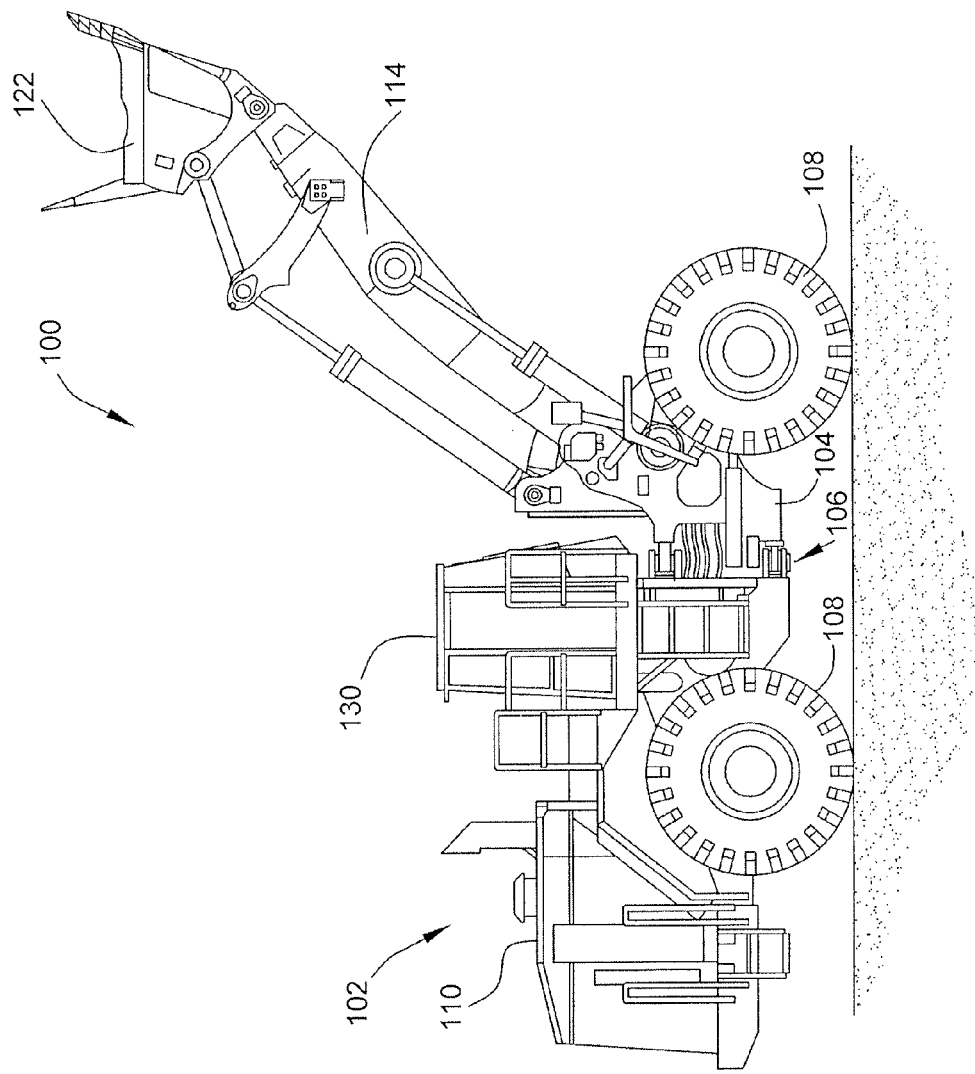
FIG. 1 is a schematic view of a machine in accordance with the disclosure.
Figure 2:
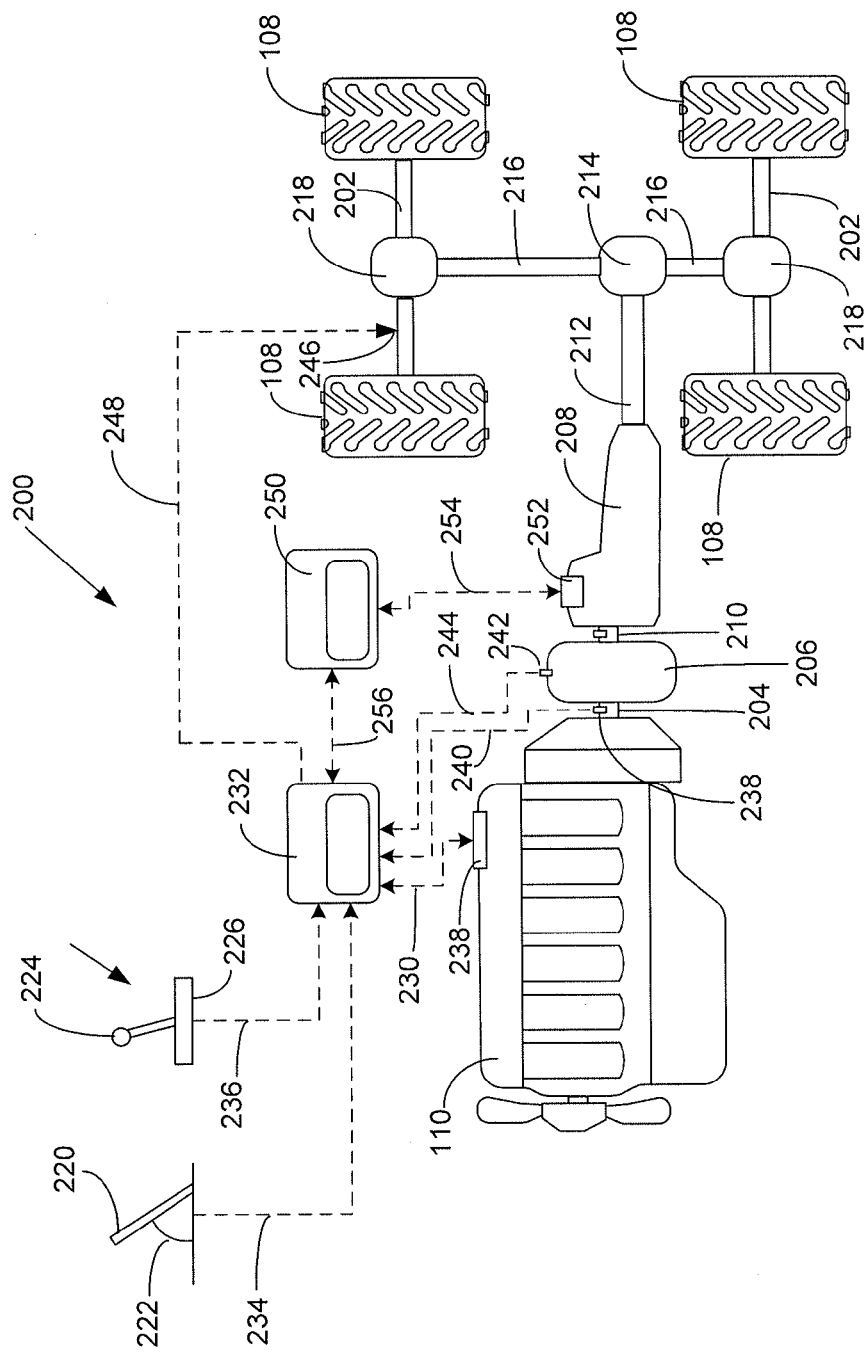
FIG. 2 is a schematic view of a powertrain for a machine in accordance with the disclosure.

FIG. 1 shows an outline of a wheel loader as one example of a vehicle or machine 100. FIG. 2 is a schematic of a powertrain 200 of the vehicle 100. In reference to these figures, the vehicle 100 includes an engine frame portion 102 connected to a non-engine frame portion 104 by an articulated joint 106. Each of the engine frame portion 102 and non-engine frame portion 104 includes a respective axle 202 connected to a set of wheels 108. The engine frame portion 102 includes the engine 110, which has an output shaft 204 connected to a torque converter 206. The torque converter 206 is in turn connected to a transmission 208 via a connecting shaft 210. An output shaft 212 of the transmission 208 is connected to a splitter 214 that powers two drive shafts 216, one for each axle 202. Each drive shaft 216 transmits power to the wheels 118 via a respective differential 218 such that rotational power provided at the engine output shaft 204 is effectively transmitted to the wheels 108. Although two driven axles 202 are shown, a single axle or more than two axles may be used depending on the type of vehicle. Moreover, although wheels are shown, other types of ground engaging members, such as tracks, may be used.

The vehicle 100 further includes an operator cab 130 that houses various machine control devices. As shown in FIG. 2, such devices include an accelerator pedal 220 having an accelerator pedal sensor (APS) 222, and a gear selector lever 224 having a lever encoder 226. The APS 222 and lever encoder 226 may be configured to provide signals indicative of the desired ground speed of the vehicle 100 that is commanded by an operator during use.

Returning now to FIG. 1, the vehicle 100 of the illustrated embodiment includes a work implement, which in this case is a bucket 122 connected at the end of a pair of lift arms 114 that are pivotally connected to the non-engine frame portion 104 of the vehicle 100 at a hinge 116.

As shown in FIG. 2, the engine 110 has an interface 228 that is connected to a communication channel 230 with an engine governor 232. The engine governor 232 operates to monitor and control the function of various engine systems, such as monitor sensor readings from various engine sensors, control engine speed and load output and so forth, by receiving information and transmitting commands to various engine components through the communication channel 230. As shown, the engine governor 232, or another controller connected to the governor 232, is further connected to various vehicle components that can control the operation of the engine. In the illustrated embodiment, the governor 232 is an electronic controller that includes a processor operably associated with other electronic components such as a data storage device and the various communication channels. In the illustration of FIG. 2, a throttle communication channel 234 and a gear selection encoder communication channel 236 are connected to the governor 232 and configured to provide to the governor 232 information indicative of the operator's commands, such as the desired engine speed or load, the desired gear selection setting, and the like. It should be appreciated that additional or alternative connections between the governor 232 and the various engine and/or vehicle systems may be present but are not shown for simplicity.

The governor 232 is further configured to receive information indicative of the operation of the remaining portion of the powertrain 200. In this way, the governor 232 is connected to an engine output shaft speed sensor 238 via an engine speed communication channel 240, a torque converter locked state sensor 242 via a torque converter communication channel 244, and to a vehicle ground speed sensor 246 via a ground speed communication channel 248.

The powertrain 200 in the illustrated embodiment includes a transmission controller 250 that is configured to control the operation of the transmission 208. Accordingly, the transmission controller 250 is connected to an interface 252 of the transmission 208 via a transmission communication channel 254. The interface 252 may include structures that can selectively engage and disengage various gear sets of the transmission 208 in response to commands from the transmission controller 250, as well as provide information to the transmission controller 250 indicative of the current gear engagement state of the transmission 208, as well as other information, such as the power transmitted to the wheels 108 through the transmission 208, the speed of the output shaft 212, the speed of the connecting shaft 210, and the like. During operation, the transmission controller 250 may command gear changes to the transmission 208 based on predetermined connecting shaft 210 speed thresholds for up-shift and downshift changes.

In the illustrated embodiment, information may be exchanged between the engine governor 232 and the transmission controller 250 via a data bus 256, but it should be appreciated that although the engine governor 232 and the transmission controller 250 are shown as separate components they may alternatively be integrated into a single control unit or separated into more than two control units. Thus, either of the engine governor 232 and/or the transmission controller 250 may be a single controller or may include more than one controller disposed to control various functions and/or features of a machine. For example, a master controller, used to control the overall operation and function of the machine, may be cooperatively implemented with a motor or engine controller, used to control the engine 110. In this embodiment, the terms "controller" or "governor" are meant to include one, two, or more controllers that may be associated with the machine 100 and that may cooperate in controlling various functions and operations of the machine 100 (FIG. 1). The functionality of these devices, while shown conceptually in the figures that follow to include various discrete functions for illustrative purposes only, may be implemented in hardware and/or software without regard to the discrete functionality shown. Accordingly, although various interfaces of the controller are described relative to components of the powertrain system in the figures that follow, such interfaces are not intended to limit the type and number of components that are connected, nor the number of controllers that are described.

Figure 3:
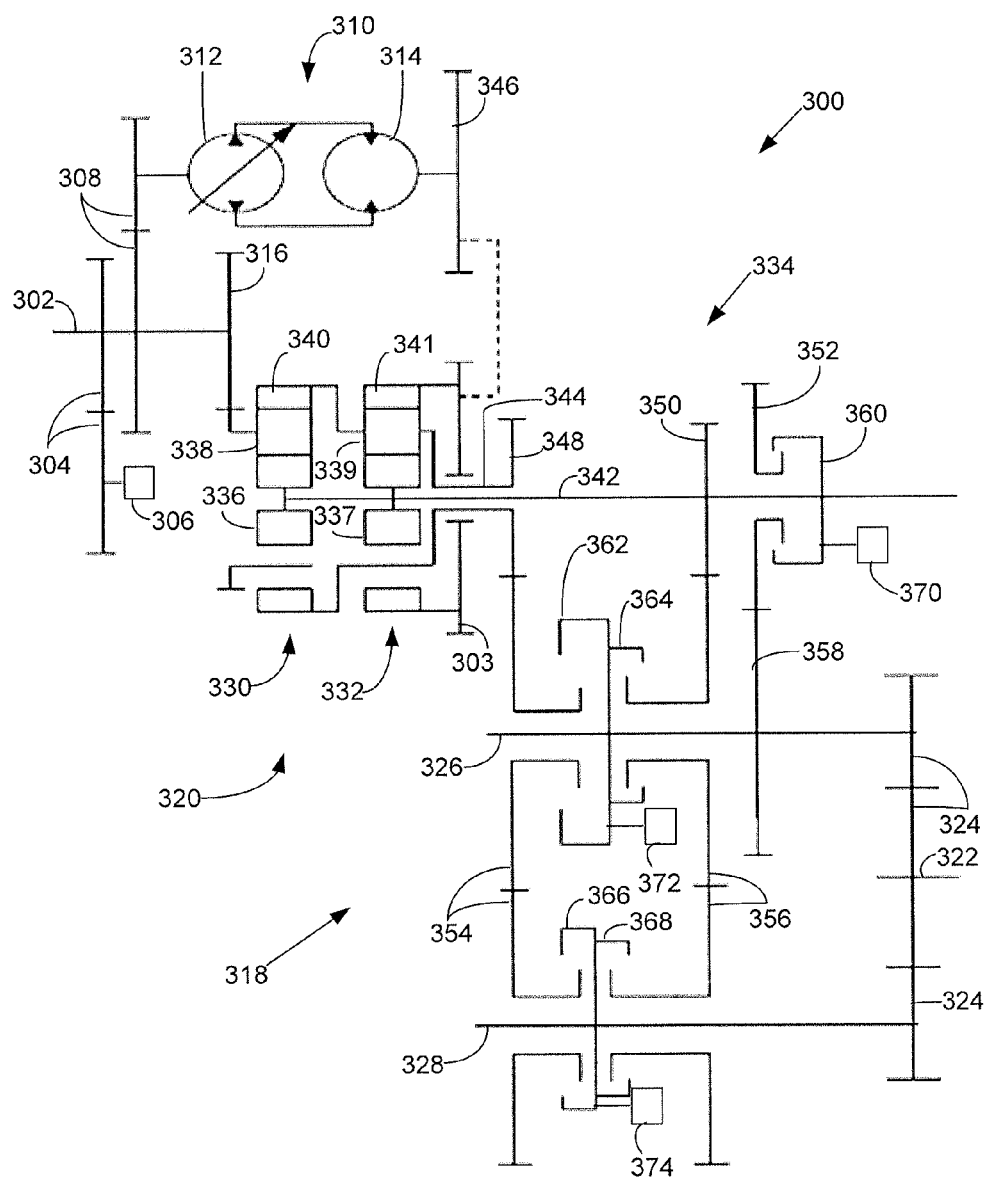
FIG. 3 is diagrammatic view of a hydro-mechanical transmission in accordance with the disclosure.

A schematic diagram of a hydro-mechanical transmission 300 in accordance with the disclosure is shown in FIG. 3. The transmission 300 includes an input shaft 302 having an input gear set 304 connected to an impeller shaft of a pump 306. The input shaft 302 is also connected to a second input gear set 308 that drives a variator 310, which in the illustrated embodiment includes a variable-displacement hydraulic pump 312 that is fluidly interconnected with and arranged to operate a hydraulic motor 314. The input shaft 302 is also connected to a mechanical transmission input gear 316. In this way, power input to the transmission 300, for example, by an engine (see engine 110 in FIG. 2) or another prime mover such as an electric motor, can be split into power provided to the variator 310 or to a mechanical transmission 318 system.

The mechanical transmission 318 includes a planetary gear arrangement 320 and a combined output shaft 322, which is connected by an output gear set 324 to first and second output members 326 and 328. In the illustrated embodiment, the first output member 326 provides a driving motion in the forward machine travel direction, and the second output member 328 provides a driving motion in the reverse machine travel direction. The planetary gear arrangement 320 includes first and second axially aligned planetary gear sets 330 and 332, and a planetary output shaft 334. The first planetary gear set 330 includes a sun gear 336, a carrier 338, and a ring gear 340. The second planetary gear set includes a sun gear 337, a carrier 339, and a ring gear 341. The planetary output shaft 334 includes an internal shaft 342 and a sleeve 344. The sleeve 344 is disposed in axial alignment over a portion of the internal shaft 342 and can be embodied as a hollow shaft or hub that is supported by the internal shaft 342. The internal shaft 342 is connected to the sun gears 336 and 337 of the first and second planetary gear sets 330 and 332. The sleeve 344 is connected to the carrier 339 of the second planetary gear set 332, which is also connected to the ring gear 340 of the first planetary gear set 330. The mechanical transmission input gear 316 is connected to the carrier 338 of the first planetary gear set 330. The ring gear 341 of the second planetary gear set 332 is connected to an output gear 346 of the hydraulic motor 314 of the variator 310.

The planetary output shaft 334 includes second and third planetary output gears 350 and 352. The first planetary output gear 348 is connected to the sleeve 344 such that motion of the ring gear 340 of the first planetary gear set 330 and/or motion of the carrier 339 of the second planetary gear set 332 is transferred through the first planetary output gear 348 to a first set of drive gears 354 that includes two gears, one of which is disposed to rotate around the first or second output member 326 and 328. The second planetary output gear 350 is connected to the internal shaft 342 such that rotation of the sun gears 336 and 337 of the first and second planetary gear sets 330 and 332 is transferred through the second planetary output gear 350 to a second set of drive gears 356 that also includes two gears, one of which is disposed to rotate around the first or second output member 326 and 328. Finally, the third planetary output gear 352 is disposed to rotate around the internal shaft 342 and is connected to a third drive gear 358 that is connected to the first output member 326.

In operation, the input shaft 302 delivers split input power to the variator 310 and to the planetary gear arrangement 320. The planetary gear arrangement 320 combines the hydrostatic output power from a second planetary gear arrangement input gear 303 with the split input mechanical power to provide hydro-mechanical output power for application to a load, such as one or more driving wheels of a vehicle, tracks of an earth-working machine, or the like. As can be appreciated, the speed and torque in each of the power ranges initially set by gear ratios of the planetary gear arrangement 320 can be infinitely varied by varying the stroke of the hydraulic pump 312 of the variator 310.

During operation, power from the input shaft 302 directly and/or through the variator 310, which is selectively subjected to an appropriate gear ratio through the planetary gear arrangement 320, is provided to the output shaft 322 by selective engagement of at least one of five clutches. More specifically, an auxiliary or first clutch 360 is connected to the internal shaft 342 and is configured to engage and power the third planetary output gear 352 such that, when the first clutch 360 is engaged, rotation of the internal shaft 342 is transferred to the first output shaft 326 via the third planetary output gear 352 and the third drive gear 358. A second clutch 362 is connected to the first output shaft 326 and, when engaged, is configured to receive driving power from the first set of drive gears 354 such that the first output shaft 326 is driven by the first planetary output gear 348. A third clutch 364 is connected to the first output shaft 326 and, when engaged, is configured to receive driving power from the second set of drive gears 356 such that the first output shaft 326 is driven by the second planetary output gear 350. In other words, the first output shaft 326 can be driven by the first planetary output gear 348 when the second clutch 362 is engaged, by the second planetary output gear 350 when the third clutch 364 is engaged, and by the third planetary output gear 352 when the first clutch 360 is engaged.

In a similar configuration, a fourth clutch 366 is connected to the second output shaft 328 and can selectively engage a hub connected to the first set of drive gears 354, and a fifth clutch 368 is connected to the second output shaft 328 and can selectively engage a hub connected to the second set of drive gears 356. In this way, the second output shaft 328 can be driven by the first planetary output gear 348 via the first set of drive gears 354 when the fourth clutch 366 is engaged, and by the second planetary output gear 350 via the second set of drive gears 356 when the fifth clutch 368 is engaged.

In the embodiment shown, each of the five clutches 360, 362, 364, 366 and 368 can include a clutch pack or, stated differently, a plurality of clutch disks, that can be selectively engaged by action of a dedicated actuator that is responsive to a control signal. In this way, a first actuator 370 is associated with the first clutch 360 and configured to engage the first clutch when an appropriate activation signal is operably provided to the first actuator 370 by an electronic controller, which in this case is the transmission controller 250 (FIG. 2). The second and third clutches 362 and 364 are shown as a compound clutch that can be selectively engaged by action of a second actuator 372, which is also responsive to signals from the transmission controller 250 and which may include two separate actuators, one for each clutch. Similarly, the fourth and fifth clutches 366 and 368 are also formed as a compound clutch that is associated with a third actuator 374, which may also include two separate actuators configured to engage and disengage each of the compound clutches. Each of the first, second and third actuator 370, 372 and 374 can be embodied as any appropriate type of clutch actuator known in the art, such as mechanical linkage, a hydraulic or electric actuator, and others. In the illustrated embodiment, the actuators are hydraulic pistons wherein the flow of hydraulic fluid to operate each piston is controlled by an electromechanical solenoid valve in the known fashion.

Based on the foregoing, the illustrated embodiment for the hydro-mechanical transmission 300 is capable of providing three forward and two reverse gear ratios for motion, as illustrated in Table 1 below, depending on which clutch is engaged:

TABLE 1

| Direction | Speed | First Clutch 360 | Second Clutch 362 | Third Clutch 364 | Fourth Clutch 366 | Fifth Clutch 368 |
|---|---|---|---|---|---|---|
| Forward | Low | off | ON | off | off | off |
|  | High | off | off | ON | off | off |
|  | Auxiliary | ON | off | off | off | off |
| Reverse | Low | off | off | off | ON | off |
|  | High | off | off | off | off | ON |

As can be seen from the table above, each of the five clutches 360 through 368 provides a particular combination of speed and direction of travel of the machine, without use of a synchronizer or other motion transfer device. A main advantage of this drive configuration is the reduced cost and increased reliability of the transmission 300 when compared to other, known transmission configurations. Further, when a shift from one gear to another is desired, the shift can occur rather quickly in that it merely requires the disengagement of one clutch and the engagement of another, which can be accomplished in a relatively short time and thus provide good shift quality that is barely perceptible to the machine operator. In the particular embodiment shown, different clutch actuators are used when shifting between successive gears, which increases the shift speed. For example, and in reference to Table 1 and FIG. 3, when moving in the forward direction and shifting from the "Low" to the "High" speed setting, the second clutch 362 by operation of the second actuator 372 is disengaged and the third clutch 364 is engaged by operation of the third actuator 374. Such simultaneous operation of the second and third actuators 372 and 374 can save time as compared to the actuation of a single actuator tasked with disengaging one clutch before engaging another. As used herein, simultaneous operation is intended to refer to operation that is completed within a short time period, for example, a time period that is less than about 250 milliseconds.

Figure 4:
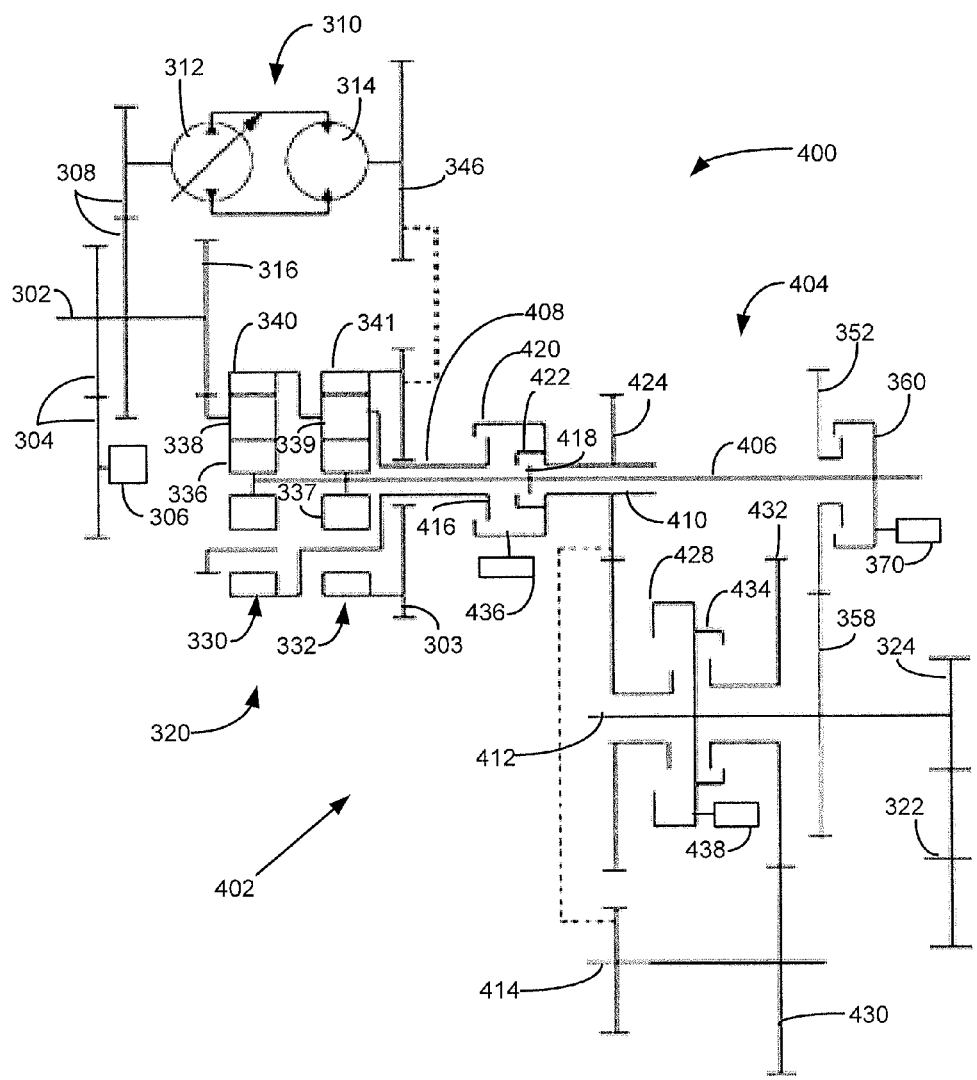
FIG. 4 is a diagrammatic view of an alternative embodiment of a hydro-mechanical transmission in accordance with the disclosure.

An alternative embodiment for a transmission 400 is shown in FIG. 4. In the transmission 400, the same or similar features and elements as previously described relative to the transmission 300 are denoted in FIG. 4 using the same reference numerals previously used for simplicity.

Accordingly, the transmission 400 includes an input shaft 302 driving the variator 310 and a mechanical transmission 402. The mechanical transmission 402 includes a planetary gear arrangement 320, which in this embodiment has a planetary output shaft 404 that includes an internal shaft 406, a first sleeve 408, and a second sleeve 410. Each of the first and second sleeves 408 and 410 is disposed in axial alignment over a portion of the internal shaft 406 and can be embodied as a hollow shaft or hub that is supported by the internal shaft 406. The output shaft 322 is connected via the output gear set 324 to a reversible output shaft 412 that, at times, cooperates with a reverse countershaft 414 as is described in more detail below.

As can be seen in FIG. 4, the hydro-mechanical transmission 400 includes five clutches, which are arranged differently than the clutch arrangement previously described relative to the transmission 300 (FIG. 3). More specifically, the transmission 400 includes the auxiliary or first clutch 360, which, much like in the transmission 300, is configured to selectively drive the third planetary output gear 352. In this embodiment as well, the third planetary output gear 352 is connected to the reversible output shaft 412 via the third drive gear 358.

In the transmission 400, unlike the transmission 300 (FIG. 3), the first sleeve 408 that is connected to the ring gear 340 and to the carrier 339 of, respectively, the first and second planetary gear sets 330 and 332, is connected to a first planetary gear output clutch disk 416. Similarly, the internal shaft 406 is connected to a second planetary gear output clutch disk 418. The first and second planetary gear output clutch disks 416 and 418 are arranged to selectively engage a second clutch 420 or a third clutch 422, both of which are connected to the second sleeve 410. In the embodiment shown, the first planetary gear output clutch disk 416 is larger than the second planetary gear output clutch disk 418 such that high gear ratios can result when the first planetary gear output clutch disk 416 is engaged and, similarly, low gear ratios can result when the planetary gear output clutch disk 418 is engaged.

The second sleeve 410 is also connected to a first drive gear 424. The first drive gear 424 meshes with a forward drive gear 426, which is connected to a clutch disk that is engaged by a forward-motion clutch 428. The forward-motion clutch 428 is connected to the reversible output shaft 412 such that, when the forward-motion clutch 428 is engaged, the output shaft 322 is driven in a forward-travel direction for the machine 100 (FIG. 1). The first drive gear 424 is also connected to a gear that is in turn connected to the reverse countershaft 414. The reverse countershaft 414 includes a second drive gear 430 that meshes with a reverse drive gear 432. The reverse drive gear 432 is connected to a clutch disk that is engaged by a reverse-motion clutch 434 that is also connected to the reversible output shaft 412 such that, when the reverse-motion clutch 434 engages, the output shaft 322 is driven in a reverse-travel direction for the machine 100.

As shown in the embodiment of FIG. 4, the forward-motion clutch 428 together with the reverse-motion clutch 434 are compound clutches, as are the second and third clutches 420 and 422. As in the embodiment of the transmission 300 shown in FIG. 3, compound clutches can be driven by hydraulic piston actuators controlled by electromechanical solenoid valves. Accordingly, the second and third clutches 420 and 422 can be selectively engaged, one at a time, by a low/high actuator 436, which may include two pistons operating the two clutches. Similarly, the forward- and reverse-motion clutches 428 and 434 can be selectively engaged by operation of a forward/reverse actuator 438 that includes two pistons operating dedicated clutch engagement pistons. In the embodiment of a transmission 400, therefore, the selection of a direction of travel and of a desired gear ratio will require the engagement of two clutches, one to set the desired high or low gear ratio, and the other to set the forward or reverse direction of travel. With the addition of an auxiliary forward gear ratio, the various settings of the transmission 400 for each of three forward and two reverse gears are illustrated in Table 2 that follows:

TABLE 2

| Direction | Speed | First Clutch 360 | Second (Low) Clutch 420 | Third (High) Clutch 422 | Forward-motion Clutch 428 | Reverse-motion Clutch 434 |
|---|---|---|---|---|---|---|
| Forward | Low | off | ON | off | ON | off |
|  | High | off | off | ON | ON | off |
|  | Auxiliary | ON | off | off | off | off |
| Reverse | Low | off | ON | off | off | ON |
|  | High | off | off | ON | off | ON |

As can be seen from Table 2, except for the "Auxiliary" forward motion, each gear ratio requires the engagement of either the second or third clutch 420 and 422 to set the low or high gear ratio, and the engagement of either the forward- or reverse-motion clutches 428 and 434 to set the direction of travel of the machine. A main advantage of this configuration over the configuration shown and described relative to the transmission 300 is improved fuel consumption in that parasitic losses due to hydraulic drag, which are produced by inactive clutches, are reduced in the transmission 400 relative to the transmission 300.

In both transmissions 300 and 400, gear changes can be accomplished smoothly when, with the aid of the variator 310, shifts are carried out at a relative speed of about zero between the outgoing and incoming gears. More specifically, the variator is used to adjust the speed of the ring gear 341 of the second planetary gear set 332 (see FIGS. 3 and 4) such that the sleeve 344 (FIG. 3) or first sleeve 408 (FIG. 4) can be at a zero rotation speed when the machine or vehicle is stationary notwithstanding the rotational input provided by the engine to the input shaft 302. This can be accomplished by driving the variator output gear 346 in a reverse direction. At this time, the internal shaft 342 (FIG. 3) or 406 (FIG. 4) is rotating at a high speed. As the machine begins to move, the sleeves 344 or 408 begin to accelerate, the internal shafts 342 or 406 begin to decelerate, and the variator 310 begins to decelerate and, when it reaches a zero speed, reverses direction and begins to accelerate in the opposite direction. A shift, for example, between a low and a high gear, occurs when the speeds of the sleeves and internal shafts are matched. This process is mirrored for downshift gear changes, and is controlled by a transmission controller, for example, the controller 250 (FIG. 2), based on various input parameters relative to the speed of the machine and/or the speed of transmission components that are monitored during operation.

Figure 5:
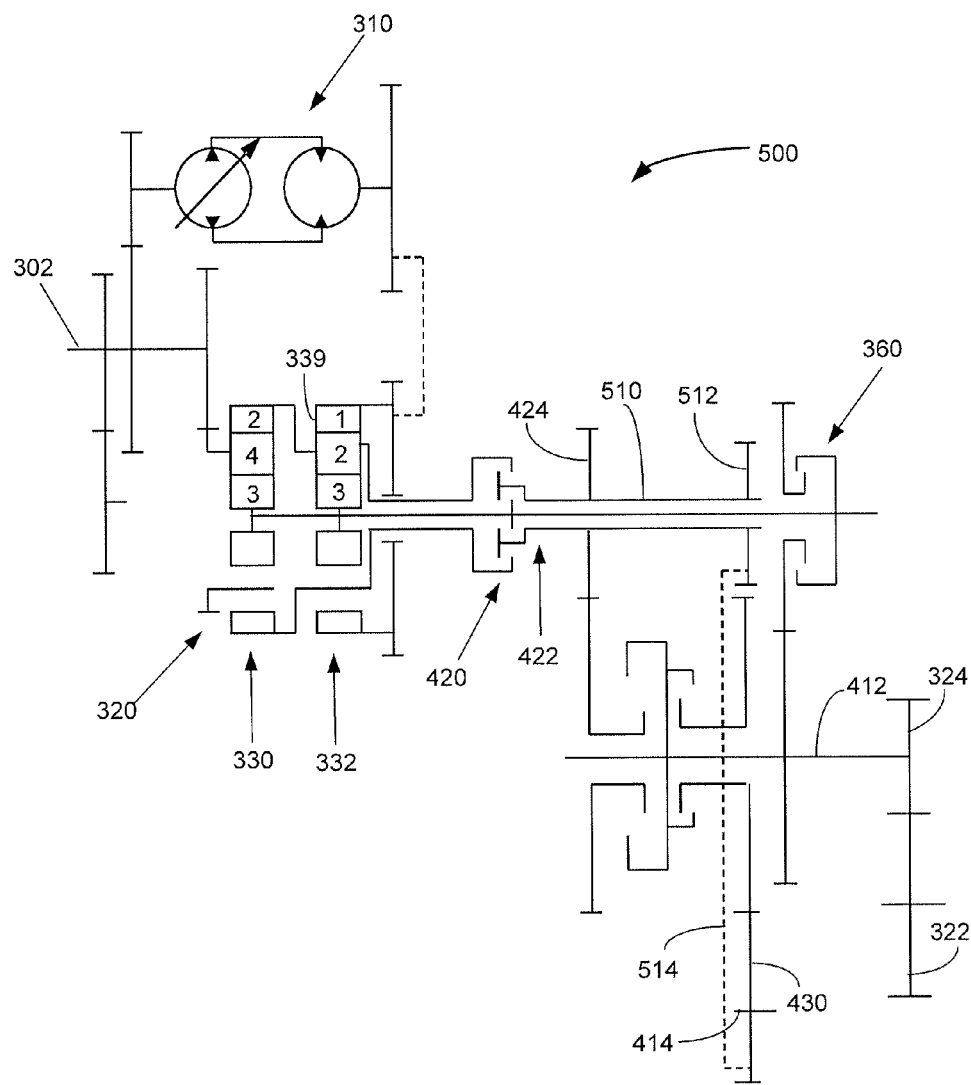
FIG. 5 is a diagrammatic view of another alternative embodiment of a hydro-mechanical transmission in accordance with the disclosure.

An alternative embodiment for a transmission 500 is shown in FIG. 5. As before, structures and features that are the same or similar to corresponding structures and features previously described are denoted in FIG. 5 with the same reference numerals as previously used for simplicity. The transmission 500 is substantially similar to the transmission 400 but differs therefrom in that the reverse countershaft 414 (FIG. 4) and the gear on that shaft that is driven by the first drive gear 424 are omitted. Accordingly, the transmission 500 includes a relatively elongated second sleeve 510 that includes the first drive gear 424 as well as an additional drive gear 512 that is connected to the second drive gear 430, for example, by a chain drive 514. All remaining structures of the transmission 500 are the same or similar to corresponding structures of the transmission 400 and are denoted by the same reference numerals as previously used for simplicity. It is noted, however, that in this embodiment, the low or second clutch 420 is splined to the carrier 339 of the second planetary gear set 332, which drives the second clutch 420 at a lower speed relative to the transmission 400 such that operation and control of the second clutch 420 can by simplified, for example, by eliminating a balance piston (not shown) that operates to control and stabilize the engagement and disengagement between the second clutch 420 and the third clutch 422.

Figure 6:
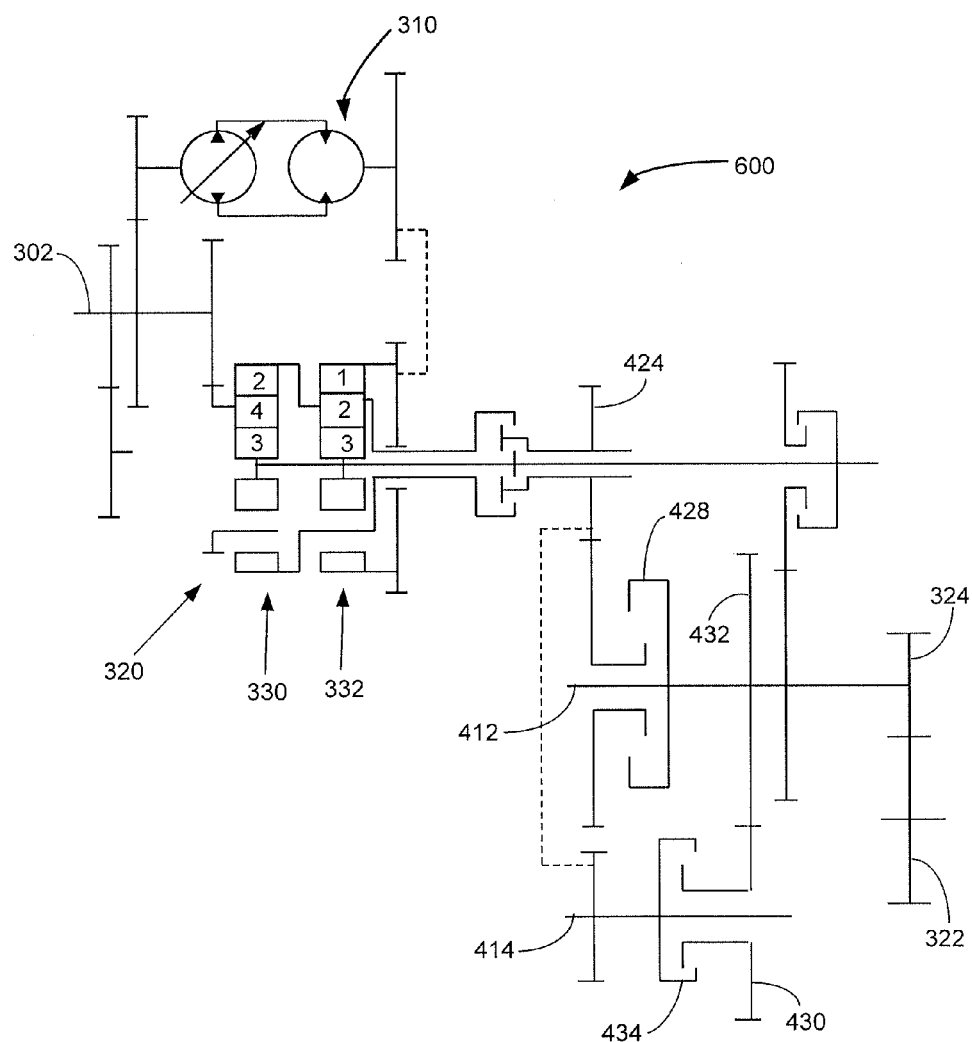
FIG. 6 is a diagrammatic view of yet another alternative embodiment of a hydro-mechanical transmission in accordance with the disclosure.

Another alternative embodiment for a transmission 600 is shown in FIG. 6. The transmission 600 is substantially similar to the transmission 400 but differs therefrom in that the reverse motion clutch 434 is moved from the reversible output shaft 412 to the reverse countershaft 414. As is more particularly shown in FIG. 6, the reverse motion clutch 434 is configured to selectively engage the reverse countershaft 414 with the second drive gear 430, which is also connected in this embodiment to the reverse drive gear 432. Although operation of the transmission 600 is similar to that of transmission 400, the placement of the reverse motion clutch 434 on the reverse countershaft 414 enables a different packaging option for the transmission on the machine or vehicle and eliminates a compound clutch in favor of two standard clutches.

Figure 7:
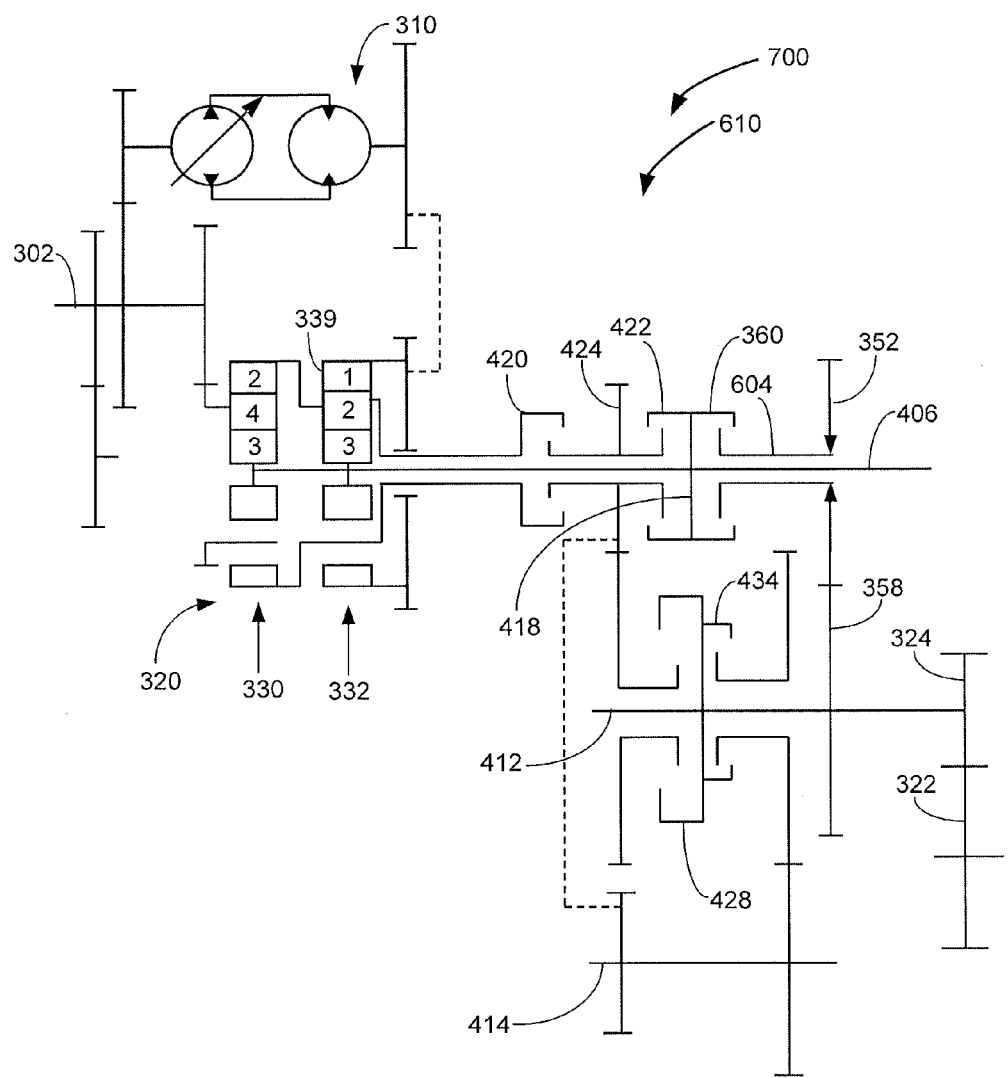
FIG. 7 is a diagrammatic view of yet another alternative embodiment of a hydro-mechanical transmission in accordance with the disclosure.

Another alternative embodiment for a transmission 700 is shown in FIG. 7. The transmission 700 is substantially similar to the transmission 400 but differs therefrom in that the high or third clutch 422 is combined into a compound clutch 610 with the auxiliary or first clutch 360 as they are both driven by the internal shaft 406. In this way, the low or second clutch 420 is a standard clutch, which in this embodiment is also splined into the carrier 339 of the second planetary gear set 332. The first clutch 360 in this embodiment drives a third sleeve 604 that is connected to the third planetary output gear 352 that drives the reversible output shaft 414 through the third drive gear 358 when the auxiliary or first clutch 360 is engaged.

Figure 8:
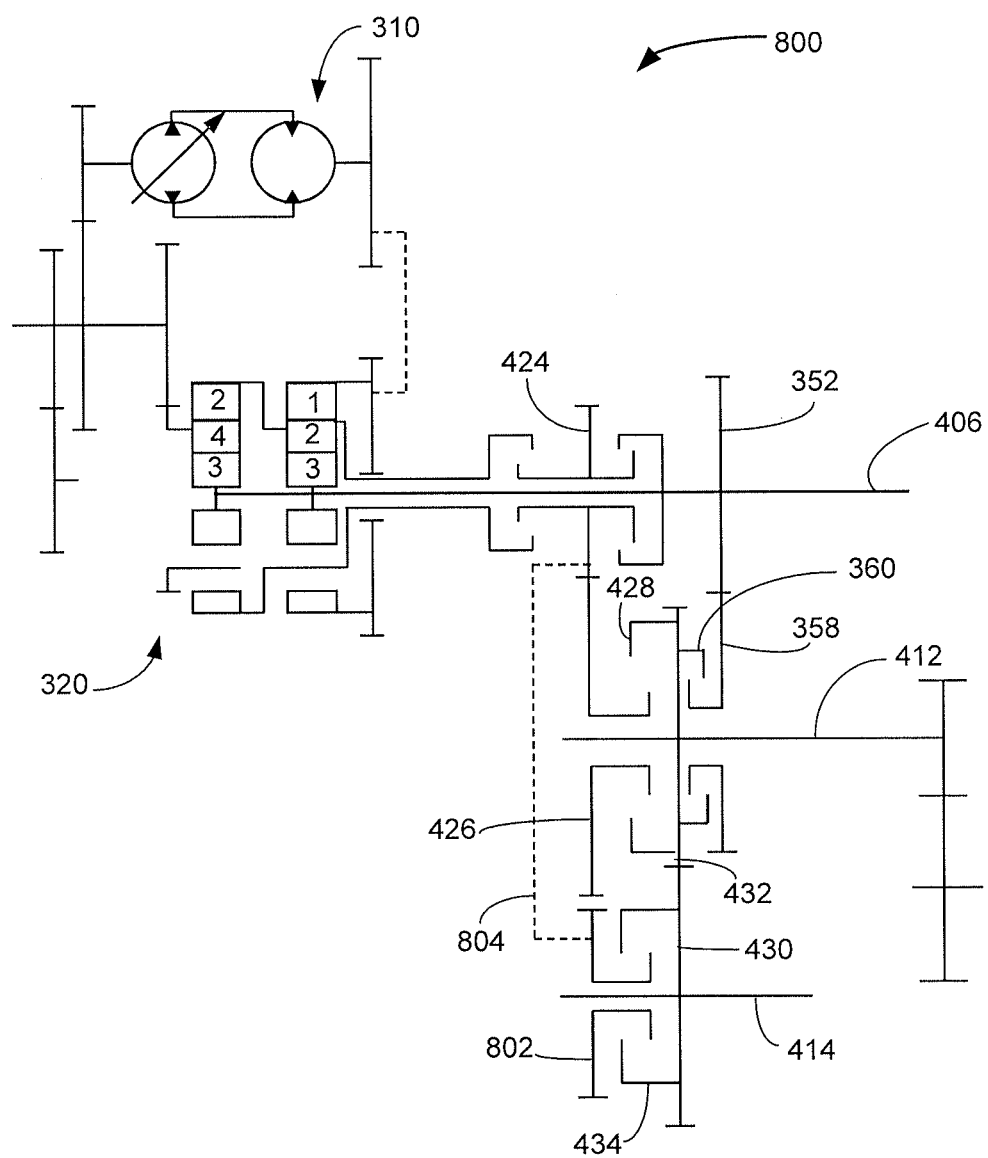
FIG. 8 is a diagrammatic view of yet another alternative embodiment of a hydro-mechanical transmission in accordance with the disclosure.

Another alternative embodiment for a transmission 800 is shown in FIG. 8. The transmission 800 is substantially similar to the transmission 400 but differs therefrom in that the auxiliary or first clutch 360 is located on the reversible output shaft 412 instead of the internal shaft 406. In the illustrated embodiment, the first clutch 360 is integrated into a compound clutch with the forward-motion clutch 428, and the reverse-motion clutch 434 is a standalone clutch that is now associated with the reverse countershaft 414. As a result, the third planetary output gear 352 is directly connected to the internal shaft 406 and is selectively connected to the reversible output shaft 412 via the third drive gear 358, which is now associated with the first clutch 360. The reverse drive gear 432 is now directly connected to the reversible output shaft 412 and selectively engages the second drive gear 430, which is now associated with the reverse-motion clutch 434 on the reverse countershaft 414. Further, the first drive gear 424 is directly connected to the forward drive gear 426 and is also connected to a reverse clutch gear 802 through a chain drive 804.

Although the connection between the reverse drive gear 432 and the second drive gear 430 in transmission 800 is shown as a direct, meshed gear connection, this and all other gear connections in the embodiments disclosed herein may be accomplished by any other known connection configuration such as by chain drives, shafts, and other rotation transmission devices, which may transmit motion directly or at a ratio.

Figure 9:
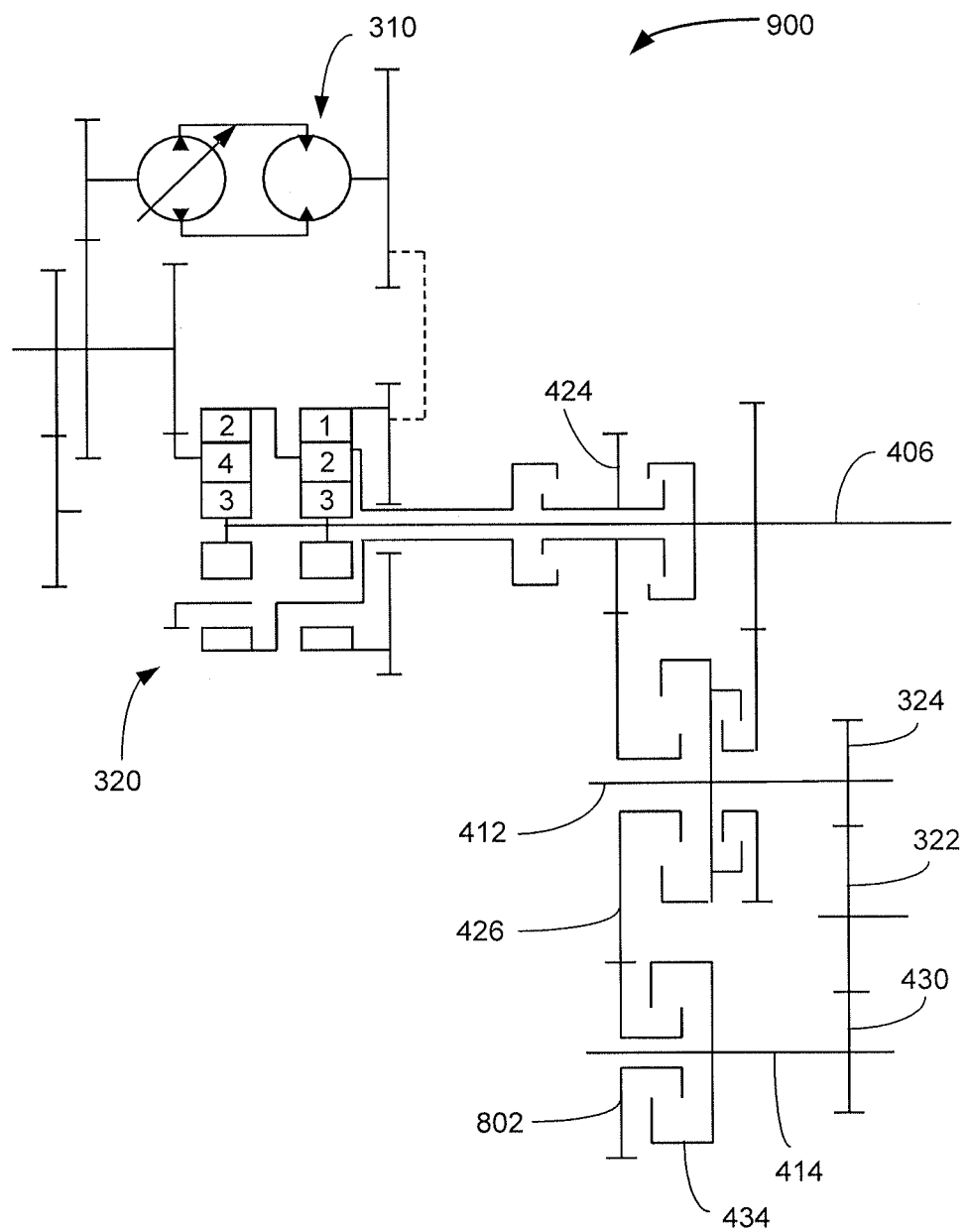
FIG. 9 is a diagrammatic view of yet another alternative embodiment of a hydro-mechanical transmission in accordance with the disclosure.

For illustration, another alternative embodiment for a transmission 900 is shown in FIG. 9. The transmission 900 is substantially similar to the transmission 800 except that the first drive gear 424 is directly connected to both the forward drive gear 426, which is directly connected to the reverse clutch gear 802, as shown in FIG. 9. Further, the second drive gear 430 of the reverse countershaft 414 is directly connected to the combined output shaft 322 in a way similar to the transmission 300 (FIG. 3).

Figure 10:
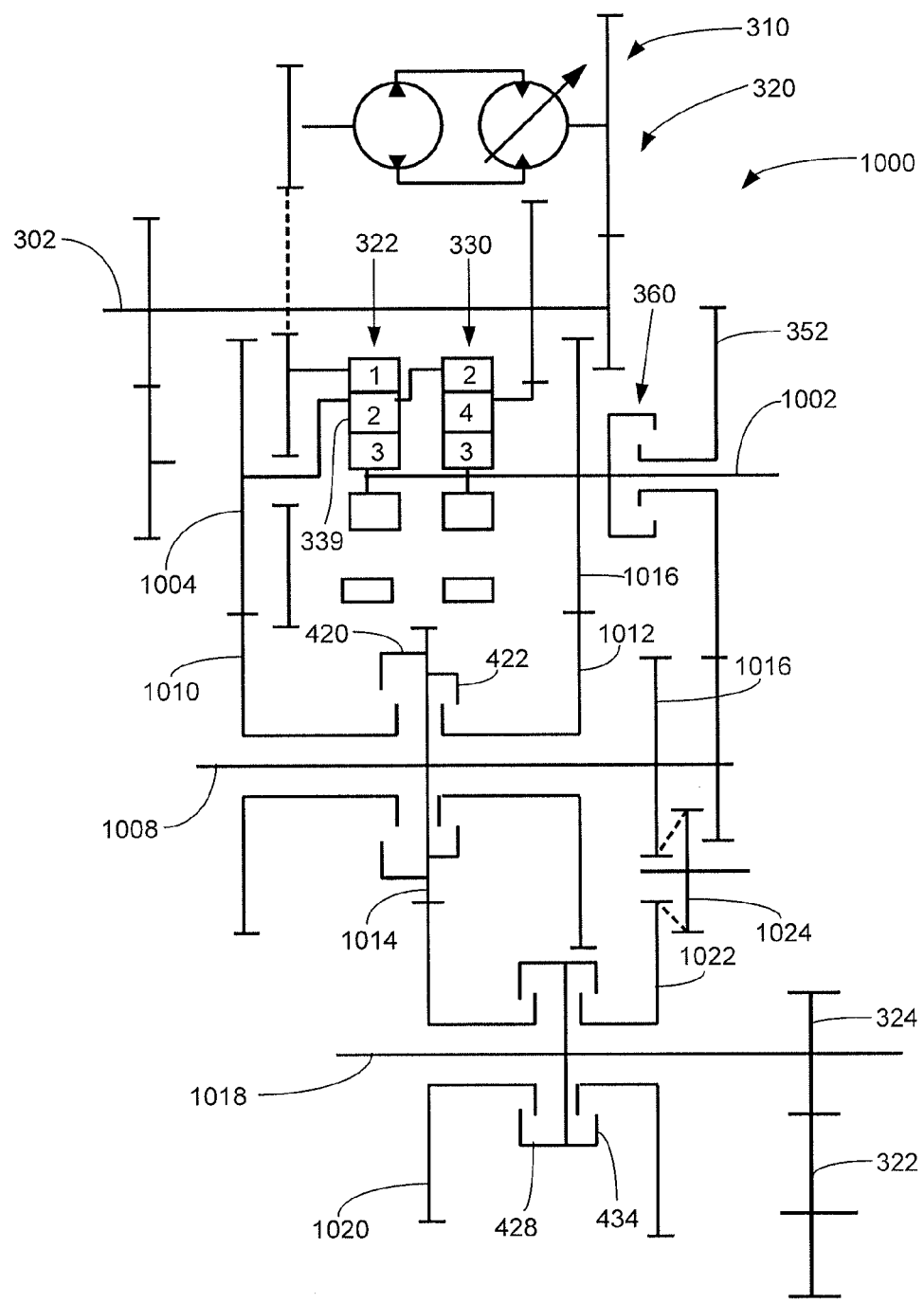
FIG. 10 is a diagrammatic view of yet another alternative embodiment of a hydro-mechanical transmission in accordance with the disclosure.

An alternative embodiment for a transmission 1000 is shown in FIG. 10. The transmission 1000 is in many ways similar to the embodiments already described, but differs from those embodiments in that the outputs of the planetary gear arrangement 320 are on both ends of the gear arrangement, which allows for a shorter or more compact design. Moreover, the flexibility of tapping into both ends of the planetary gear arrangement enables more flexibility and allows a third or reverse gear selection to be provided by the use of the five clutches.

More specifically, a first output shaft 1002, which is functionally similar to the internal shaft 406 of the previously described embodiments, includes the auxiliary or first clutch 360 that is engageable with the third planetary output gear 352. In this embodiment, the transmission 1000 further includes a low output gear 1004 and a high output gear 1006. The high output gear 1006 is connected to the first output shaft 1002. The low output gear 1004 is driven through the carrier 339 of the second planetary gear set 332. The second and third clutches 420 and 422 are connected to a second output shaft 1008 such that the second clutch 420 (low gear) is engageable with the low output gear 1004 via a low drive gear 1010 and the third clutch 422 (high gear) is engageable with the high output gear 1006 via a high drive gear 1012. The second and third clutches 420 and 422 are shown as a compound clutch, which in this embodiment further includes a forward drive gear 1014. A reverse drive gear 1016 is connected to the second output shaft 1008.

The transmission 1000 further includes a third output shaft 1018 that includes the fourth and fifth clutches 428 and 434 that provide forward and reverse motion to the machine. The forward drive gear 1014 is engageable with the fourth clutch 428 via a transfer gear 1020. The fifth clutch 434 is engageable with the reverse drive gear 1016 via a transfer gear 1022 and an idler gear 1024. In the embodiment of the transmission 1000, the selection of a direction of travel and of a desired gear ratio will require the engagement of two clutches, one to set the desired high, low or auxiliary gear ratio, and the other to set the forward or reverse direction of travel. Unlike the transmission 400 (FIG. 4), where the auxiliary clutch 360 can be engaged by itself to drive the machine forward, in this embodiment, engagement of the forward-motion or fourth clutch 428 is also required to drive the machine forward. Accordingly, the various settings of the transmission 1000, which includes three forward and three reverse gear selections, are illustrated in Table 3 that follows:

TABLE 3

| Direction | Speed | First (Auxiliary) Clutch 360 | Second (Low) Clutch 420 | Third (High) Clutch 422 | Fourth Clutch 428 | Fifth Clutch 434 |
|---|---|---|---|---|---|---|
| Forward | Low | off | ON | off | ON | off |
|  | High | off | off | ON | ON | off |
|  | Auxiliary | ON | off | off | ON | off |
| Reverse | Low | off | ON | off | off | ON |
|  | High | off | off | ON | off | ON |
|  | Auxiliary | ON | off | off | off | ON |

Figure 11:
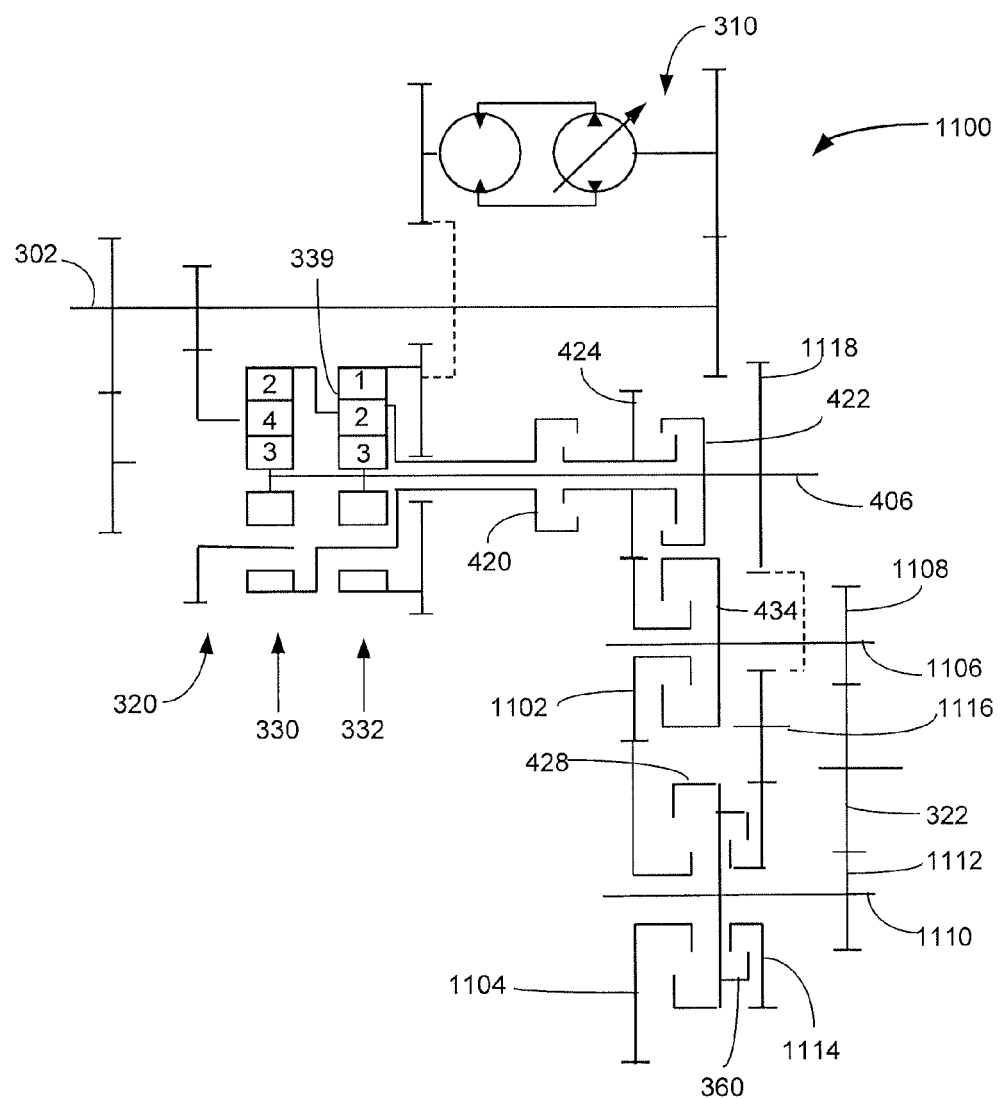
FIG. 11 is a diagrammatic view of yet another alternative embodiment of a hydro-mechanical transmission in accordance with the disclosure.

An alternative embodiment for a transmission 1100 is shown in FIG. 11. The transmission 1100 is similar to certain aspects of transmission 700 (FIG. 7) and 1000 (FIG. 10), as well as the other transmissions previously described. In the transmission 1100, however, an idler gear associated with the input or output shafts 302 or 322, respectively, is omitted such that rotation at the output is the same as the input. The variator 310 of transmission 1100 is installed in a similar orientation to the variator installation in the transmission 1000 (FIG. 10). Similar to the transmission 700, the transmission 1100 includes a first drive gear 424 disposed on a sleeve surrounding the internal shaft 406, which is driven by the sun gears 336 and 337 of the first and second planetary gear sets 330 and 332. The first drive gear 424 is selectively engageable with either the second (low) clutch 420 or the third (high) clutch 422. The driving connections of the second and third clutches 420 and 422 in transmission 1100 are the same as the corresponding connections in transmission 700.

The first drive gear 424 is meshed with a reverse drive gear 1102, which in turn is meshed with a forward drive gear 1104. The reverse drive gear 1102 is engageable with the fifth or reverse-motion clutch 434, and the forward drive gear 1104 is engageable with the fourth or forward-motion clutch 428. The reverse-motion clutch 434 is connected to and drives a reverse output shaft 1106, which is connected to the output shaft 322 via a gear 1108. Similarly, the forward-motion clutch 428 is connected to and drives a forward output shaft 1110, which is also connected to the output shaft 322 via a gear 1112.

In variation from the previously described embodiments, the transmission 1100 has the first or auxiliary clutch 360 connected to the forward output shaft 1110 rather than directly to an output of the planetary gear arrangement 320. In the illustrated embodiment, the auxiliary clutch 360 is integrated with the forward-motion clutch 428 in a compound clutch arrangement. The auxiliary clutch 360 is engageable with an auxiliary drive gear 1114, which is meshed with an idler gear 1116. The idler gear 1116 is connected, for example, via chain, to an auxiliary output gear 1118 that is connected to the internal shaft 406. In this way, the auxiliary clutch 360 can directly connect the output of the planetary gear arrangement with the output shaft 322 of the transmission 1100 for travel, as shown, in the forward direction, without having to also engage the forward-motion clutch 428. The various settings of the transmission 1100, which includes three forward and two reverse gear selections, are illustrated in Table 4 that follows:

TABLE 4

| Direction | Speed | First (Auxiliary) Clutch 360 | Second (Low) Clutch 420 | Third (High) Clutch 422 | Fourth Clutch 428 | Fifth Clutch 434 |
|---|---|---|---|---|---|---|
| Forward | Low | off | ON | off | ON | off |
|  | High | off | off | ON | ON | off |
|  | Auxiliary | ON | off | off | off | off |
| Reverse | Low | off | ON | off | off | ON |
|  | High | off | off | ON | off | ON |

INDUSTRIAL APPLICABILITY

The present disclosure is applicable to hydro-mechanical transmissions and, more particularly, to hydro-mechanical transmissions for use in medium to heavy-duty applications, both for on-highway vehicles as well as for off-highway and earth-moving machines. The disclosure provides systems and methods for hydro-mechanical transmissions, for which exemplary embodiments of transmissions having three forward and two reverse gears are presented. It is contemplated, however, that the structures and methods described herein can be adapted for transmissions having fewer or more than three forward gears and/or fewer or more than two reverse gears. Accordingly, the disclosed systems and methods should be considered for their general teachings in addition to their specific implementations.

Figure 12:
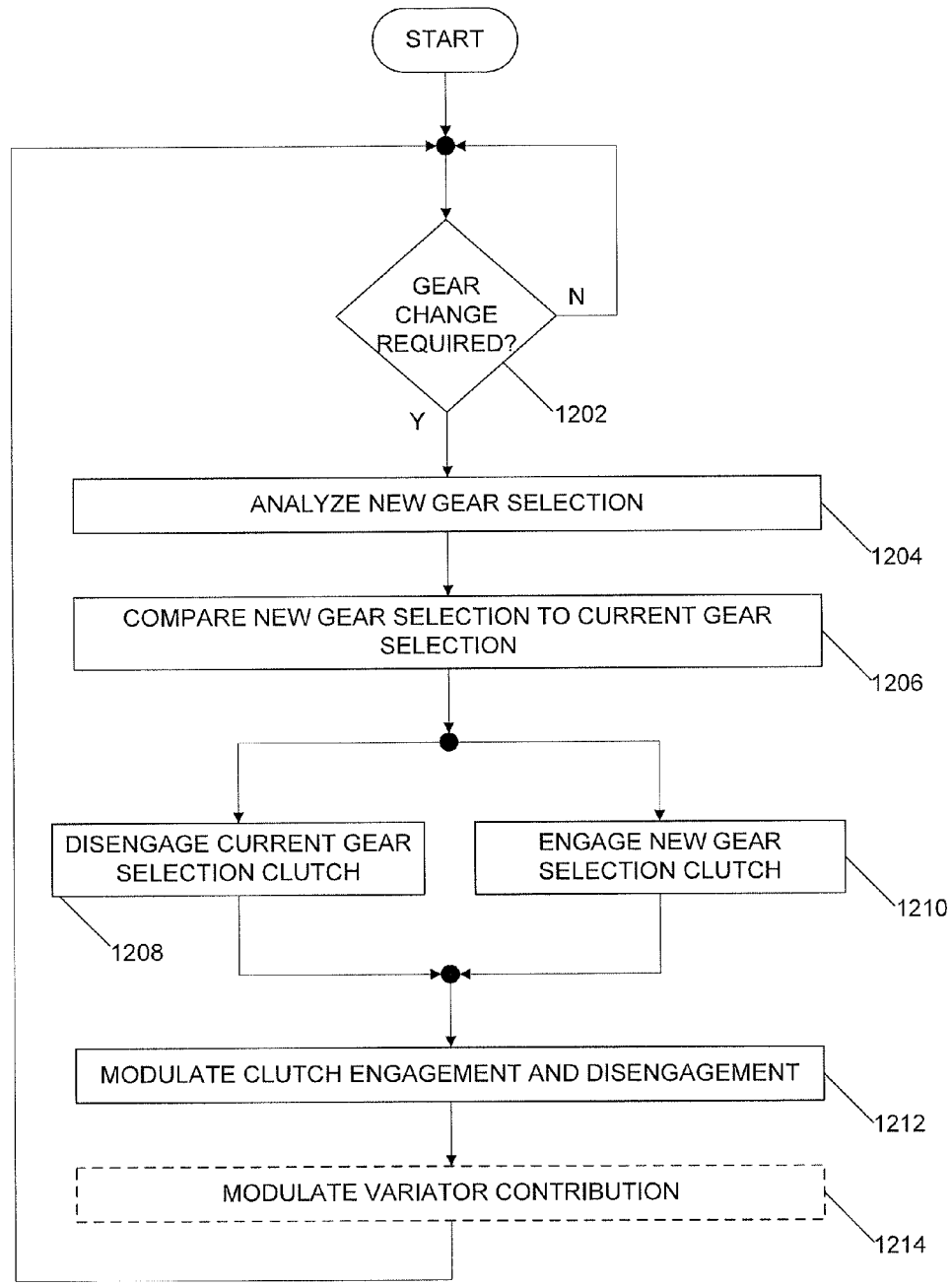
FIG. 12 is a flowchart for a method of operating a hydro-mechanical transmission in accordance with the disclosure.

A flowchart for a method of operating a hydro-mechanical transmission is shown in FIG. 12. The process begins by a decision being made in a transmission controller to change a gear in a transmission from a current gear selection to a new gear selection at 1202. The decision to change from the current to the new gear selection may be based on a determination in the controller that a shift is required based on various operating parameters of the transmission, such as the speed and/or torque of the transmission's input and/or output shaft, or may alternatively (or additionally) be a decision by an operator or another controller of the machine that is relayed to the transmission controller.

The transmission controller may analyze the new gear selection at 1204 to determine the direction and desired gear ratio of the new gear selection. For example, in the transmission 300 previously described, the transmission controller may analyze the new gear selection to determine whether it is a forward or reverse gear and whether it is a low, high, or auxiliary gear ratio. The transmission controller may then compare the new gear selection to parameters of the current gear selection at 1206 to determine which clutch of the transmission should be disengaged to release the current gear selection, and also which clutch should be engaged to adopt the new gear selection. In a coordinated fashion, for example, when a substantially zero relative speed is present between the current gear ratio gears and the new gear ratio gears, the transmission controller may disengage a single clutch at 1208 to release a current gear selection, and engage a single clutch at 1210 to adopt the new gear selection. The transmission controller may optionally modulate the disengagement and engagement of the clutches at 1212, as well as modulate a pump displacement at a variator that is associated with the transmission and which provides hydraulic assistance to the ring of at least one planetary gear system at 1214, to ensure that a shift is as smooth as desired, and the process can repeat.

Figure 13:
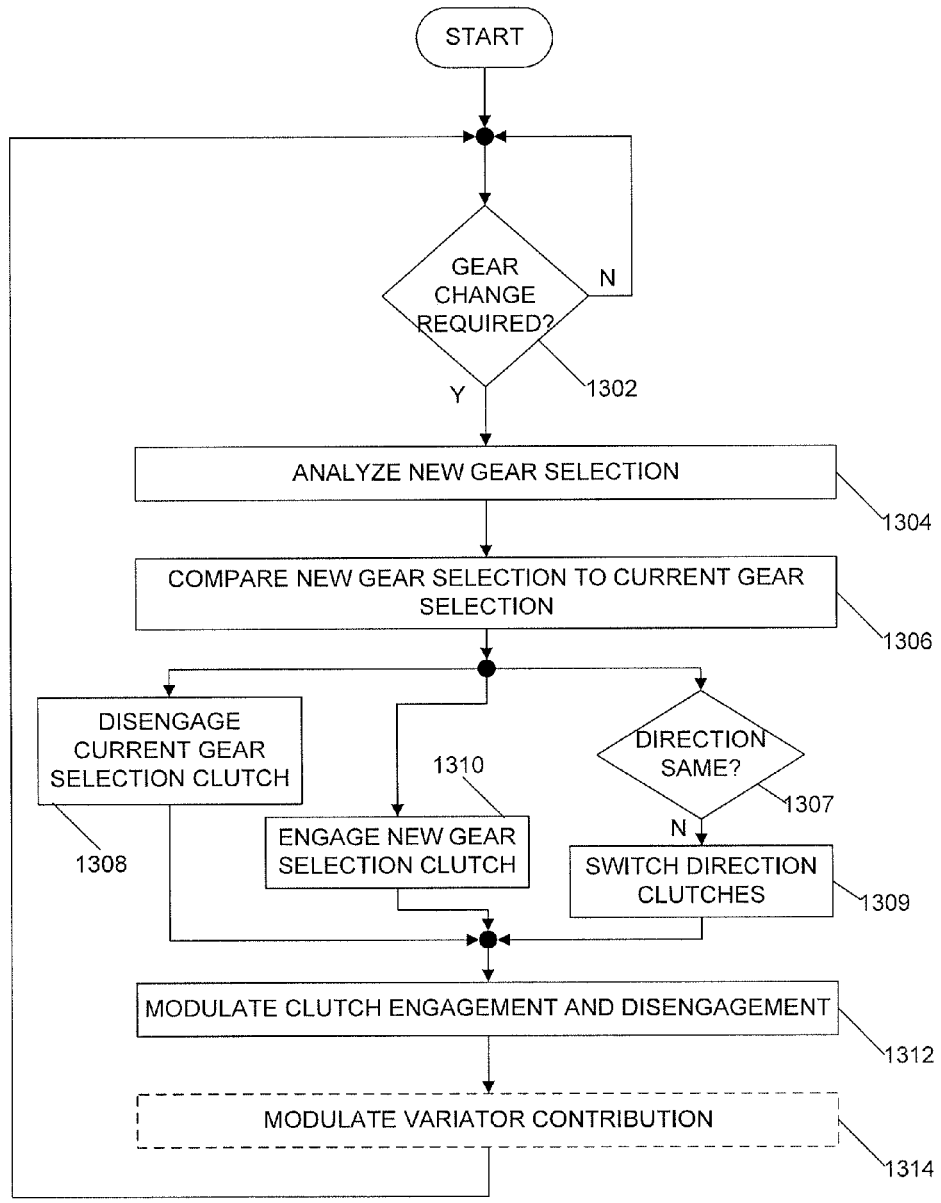
FIG. 13 is a flowchart for an alternative method of operating a hydro-mechanical transmission in accordance with the disclosure.

A flowchart for an alternative method of operating a hydro-mechanical transmission is shown in FIG. 13. The process begins by a decision being made in a transmission controller to change a gear in a transmission from a current gear selection to a new gear selection at 1302. The decision to change from the current to the new gear selection may be based on a determination in the controller that a shift is required based on various operating parameters of the transmission, such as the speed and/or torque of the transmission's input and/or output shaft, or may alternatively (or additionally) be a decision by an operator or another controller of the machine that is relayed to the transmission controller.

The transmission controller may analyze the new gear selection at 1304 to determine the direction and desired gear ratio of the new gear selection. For example, in the transmission 400 previously described, the transmission controller may analyze the new gear selection to determine whether it is a forward or reverse gear and whether it is a low, high, or auxiliary gear ratio. The transmission controller may then compare the new gear selection to parameters of the current gear selection at 1306 to determine which clutches of the transmission should be disengaged to release the current gear selection, and also which clutches should be engaged to adopt the new gear selection.

When the transmission is already operating in a direction of travel shared between the current and new gear selections, for example, a forward-travel mode, the controller may maintain engagement of a clutch that determines the travel direction for the machine at 1307, for example, the forward-motion clutch 428 as shown in the embodiment of FIG. 4. If a travel direction change is required at 1309, the controller may disengage a current travel direction clutch and engage a new travel direction clutch. In a coordinated fashion, the transmission controller may further disengage a single clutch at 1308 to release a current gear selection and engage a different single clutch at 1310 to adopt the new gear selection. In reference to the embodiment shown in FIG. 4, for example, a change in direction may involve the switch between the fourth and fifth clutches 428 and 434, as appropriate, and a shift from a low to a high gear ratio may involve the disengagement of the second clutch 420 and the engagement of the third clutch 422 or vice versa, as appropriate. The transmission controller may optionally further modulate the disengagement and engagement of the clutches at 1312, as well as modulate a pump displacement at a variator at 1314, which is associated with the transmission and which provides hydraulic assistance to the ring of at least one planetary gear system, to ensure that a shift is as smooth as desired. The process may repeat in this way continuously during operation of the machine.

The operations described below relative to the flowcharts presented are operations that may be performed by the electronic controller 250 and/or the governor 232 shown in FIG. 2 in accordance with appropriate control algorithms being executed therein. That is, the disclosed processes may be executed by an electronic controller via the execution of computer-executable instructions, e.g., in machine language form or otherwise, read from a computer-readable medium, e.g., volatile or permanent memory, magnetic or optical discs, or other tangible media. While the methodology is described with reference to the electronic controllers shown in FIG. 2, the method is applicable to any controller that monitors and controls the operation of a transmission in a machine or vehicle powertrain. Also, while particular sequences are described above, such description is shown for convenience and it should be understood that the disclosure is applicable to controlling the operation of a transmission according to different steps as well.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine powertrain that includes an engine connected to a continuously variable transmission, the continuously variable transmission comprising:
   a planetary gear arrangement having first and second planetary gear sets, the first planetary gear set being connected to a planetary input, a sun gear of the second planetary gear set being connected to a first output shaft and a carrier gear of the second planetary gear set being connected to a second planetary output;
   a variator including a variable-speed prime mover, the variable-speed prime mover configured to drive a ring gear of the second planetary gear set;
   a transmission input shaft driven by the engine and configured to drive the variator and the planetary input;
   a second output shaft and a third output shaft, at least one of the second and third output shafts being connected to a transmission output shaft;
   a first clutch connected to the first output shaft;

a second clutch connected to the second planetary output and configured to releasably engage a first drive gear, wherein the first drive gear is configured to rotate in an opposite direction relative to the third output shaft;

a third clutch connected to the first output shaft and configured to releasably engage the first drive gear;

a fourth clutch connected to the first drive gear and configured to releasably engage the second output shaft; and a fifth clutch connected to the first drive gear and configured to releasably engage the third output shaft, wherein the continuously variable transmission is configured to provide at least two forward-motion gear ratios and at least two reverse-motion gear ratios between the transmission input shaft and the transmission output shaft when one of the first clutch and the second clutch, and one of the third clutch and the fourth clutch, are simultaneously engaged.

2. The machine powertrain of claim 1, wherein the first and second clutches are integrated into a compound clutch connected to the first drive gear, wherein the third and fourth clutches are integrated into an additional compound clutch connected to the second output shaft, and wherein the third output shaft is a reverse countershaft.

3. The machine powertrain of claim 1, wherein the second clutch is splined to the carrier gear of the second planetary gear set.

4. The machine powertrain of claim 1, wherein the fourth clutch is connected to the second output shaft, and wherein the fifth clutch is connected to the third output shaft.

5. The machine powertrain of claim 1, wherein the first and third clutches are integrated into a compound clutch that is connected to the first output shaft, and wherein the fourth and fifth clutches are integrated into an additional compound clutch connected to the second output shaft.

6. The machine powertrain of claim 1, wherein the second and third clutches are integrated into a compound clutch that is connected to the second output shaft and to the fourth clutch, wherein the fourth and fifth clutches are integrated into an additional compound clutch that is connected to the third output shaft, wherein the third output shaft and not the second output shaft is connected to the transmission output shaft, and wherein the first clutch releasably engages the first output shaft with the third output shaft when the fifth clutch is engaged.

7. A machine powertrain that includes an engine connected to a continuously variable transmission, the continuously variable transmission comprising:

a planetary gear arrangement having first and second planetary gear sets, the first planetary gear set being connected to a planetary input, a sun gear of the second planetary gear set being connected to a first output shaft and a carrier gear of the second planetary gear set being connected to a second planetary output;

a variator including a variable-speed prime mover, the variable-speed prime mover configured to drive a ring gear of the second planetary gear set;

a transmission input shaft driven by the engine and configured to drive the variator and the planetary input;

a second output shaft and a third output shaft, at least one of the second and third output shafts being connected to a transmission output shaft;

a first clutch connected to the first output shaft;

a second clutch connected to the second planetary output and configured to releasably engage a first drive gear, wherein the first drive gear is configured to rotate in an opposite direction relative to the third output shaft;

a third clutch connected to the first output shaft and configured to releasably engage the first drive gear;

a fourth clutch connected to the first drive gear and configured to releasably engage the second output shaft; and a fifth clutch connected to the first drive gear and configured to releasably engage the third output shaft, wherein the continuously variable transmission is configured to provide between the transmission input shaft and the transmission output shaft:

a first forward-motion gear ratio when the second and fourth clutches are engaged, a second forward-motion gear ratio when the third and fourth clutches are engaged, a first reverse-motion gear ratio when the third and fourth clutches are engaged, and a second reverse-motion gear ratio when the third and fifth clutches are engaged.

8. The machine powertrain of claim 7, wherein the first clutch is configured to releasably engage the second output shaft, and wherein the continuously variable transmission is further configured to provide a third forward-motion gear ratio when the first clutch is engaged.

9. The machine powertrain of claim 7, wherein the first clutch is configured to releasably engage the first drive gear such that the continuously variable transmission is further configured to provide:

a third forward-motion gear when the first and fourth clutches are engaged, and a third reverse-motion gear when the first and fifth clutches are engaged.

10. A machine powertrain that includes an engine connected to a continuously variable transmission, the continuously variable transmission comprising:

a planetary gear arrangement having first and second planetary gear sets, the first planetary gear set being connected to a planetary input, a sun gear of the second planetary gear set being connected to a first output shaft and a carrier gear of the second planetary gear set being connected to a second planetary output;

a variator including a variable-speed prime mover, the variable-speed prime mover configured to drive a ring gear of the second planetary gear set;

a transmission input shaft driven by the engine and configured to drive the variator and the planetary input;

a second output shaft and a third output shaft, at least one of the second and third output shafts being connected to a transmission output shaft;

a first clutch connected to the first output shaft;

a second clutch connected to the second planetary output and configured to releasably engage a first drive gear, wherein the first drive gear is configured to rotate in an opposite direction relative to the third output shaft;

a third clutch connected to the first output shaft and configured to releasably engage the first drive gear;

a fourth clutch connected to the first drive gear and configured to releasably engage the second output shaft; and a fifth clutch connected to the first drive gear and configured to releasably engage the third output shaft, wherein the first and fourth clutches are integrated into a compound clutch that is connected to the second output shaft, and wherein the fifth clutch is connected to the third output shaft.

11. The machine powertrain of claim 10, wherein the second and third output shafts are both connected to the transmission output shaft.

12. The machine powertrain of claim 10, wherein the first clutch is connected to the second output shaft via an idler gear.

13. The machine powertrain of claim 10, wherein the continuously variable transmission is configured to provide at least two forward-motion gear ratios and at least two reverse-motion gear ratios between the transmission input shaft and the transmission output shaft when one of the first clutch and the second clutch, and one of the third clutch and the fourth clutch, are simultaneously engaged.

* * * * *